United States Patent [19]

Noyes

[11] 4,332,193
[45] Jun. 1, 1982

[54] THERMAL LINE PRINTER

[76] Inventor: Billy P. Noyes, 104 E. Rock Rd., Norwalk, Conn. 06851

[21] Appl. No.: 139,954

[22] Filed: Apr. 14, 1980

[51] Int. Cl.³ .......................... B41J 3/50; B65B 61/00
[52] U.S. Cl. ............................. 101/93.01; 101/93.08; 101/93.11; 400/120; 53/131; 53/411; 493/323
[58] Field of Search ............... 101/426, 93.08, 93.01, 101/66, 93.11, DIG. 13, 32; 400/103, 118, 119, 125, 120; 493/411, 131, 138 A, 290; 216/219

[56] References Cited

U.S. PATENT DOCUMENTS 3,668,818  6/1972  Holmes ................................ 53/131
3,712,210  1/1973  Landis ......................... 101/93.08 X

FOREIGN PATENT DOCUMENTS 2341181  3/1974  Fed. Rep. of Germany ...... 400/120
52-52700  4/1977  Japan ..................................... 101/66
52-69340  6/1977  Japan ................................... 400/120
1237443  6/1971  United Kingdom ................. 101/66

Primary Examiner—E. H. Eickholt
Attorney, Agent, or Firm—Bachman and LaPointe

[57] ABSTRACT

A thermal or electrostatic line printing process and apparatus is disclosed which employs a plurality of thermal or electrostatic print heads for coding a heat sensitive or electro sensitive article with a plurality of character lines in high speed production operations.

4 Claims, 6 Drawing Figures

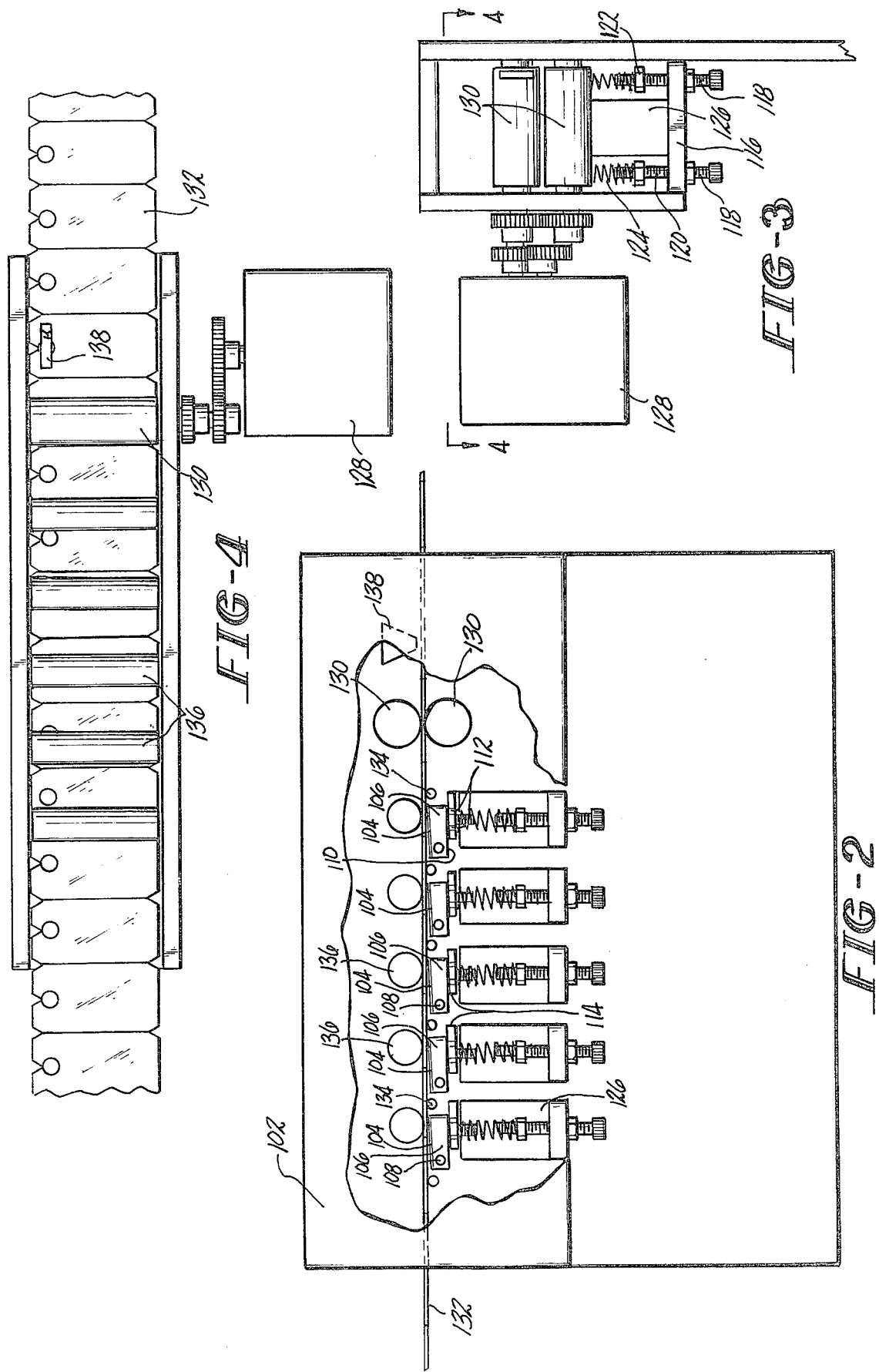

THERMAL LINE PRINTER

BACKGROUND OF THE INVENTION

The present invention relates to a method and apparatus for imprinting indicia on an article and more particularly code indicia on an article which is to be applied to goods.

While the method and apparatus will be described with reference to coding closure tabs in a bakery packaging line, it will be appreciated that broader applications can be made without departing from the principles described herein.

Known coding systems used in relatively high speed production operations (100 items per minute) such as coding bakery goods or the like employ conventional type blocks containing the type characters which make up the desired indicia. The use of type blocks in existing coding systems results in two major disadvantages, namely, an unfavorable impact on both the cost and the efficiency of the operation. For example, in the bakery industry it is the general practice today to package the bakery products in a flexible bag made of plastic or the like and to close the bag mouth by capturing the same in an opening provided in a tab. The coding indicia is applied to the closure tab and generally consists of the unit price, last day of sale, recall code, etc. It is not unusual for single type blocks to contain up to thirty to forty characters which must continually be replaced to reflect price changes and other format changes dictated by the particular industry and/or government regulation. As a result of the foregoing, existing coding systems are characterized by high inventory costs for maintaining the necessary type and ink inventories as well as increased labor costs for constantly changing the code information. An additional and equally significant problem encountered when employing known coding systems is the unfavorable impact the use of conventional type blocks has on the efficiency of the operation. In order to make the necessary coding changes during production runs the entire system must be shut down for a significant amount of time resulting in decreased production. Thus, it would be highly desirable to produce a method and apparatus for imprinting code indicia on articles which eliminates the necessity of maintaining costly type and ink inventories and which allows for easy and rapid coding changes without a costly loss of production time and thereby fulfill a long-felt need in the coding industry.

Accordingly, it is the principal object of the present invention to provide an improved method and apparatus for imprinting indicia on an article which eliminates the necessity of employing conventional type blocks.

It is a further object of the present invention to provide a method and apparatus for coding articles which is fully automatic in nature.

It is a still further object of the present invention to provide a method and apparatus for coding articles which employs a thermal or electrostatic print element.

It is still another object of the present invention to provide a method and apparatus for coding a closure member which is applied to goods.

Further objects and advantages of the present invention will appear hereinbelow.

SUMMARY OF THE INVENTION

In accordance with the present invention it has been found that the foregoing objects and advantages may be readily obtained.

The process and apparatus of the present invention will be described in terms of a thermal line print system. It should be appreciated that an electrostatic print head and electrostatic sensitive medium may be substituted for the thermal print head and thermal medium described herein without departing from the principles of the present invention. However, a thermal line printing system is preferred over an electrostatic system because of, for example, cost considerations.

The preferred process of the present invention comprises the steps of providing an article to be coded with a thermal sensitive surface, feeding the article to a thermal line printer where the article is properly coded and applying the coded article to goods. In the preferred embodiment of the present invention the process comprises coding and packaging of bakery goods comprising the steps of providing a closure tab having an opening therein with a thermal sensitive surface, feeding the tab at production speeds to a thermal line printer, coding the tab in the thermal line printer and feeding the coded tab to a bag closing machine where the mouth of a bag containing baked goods is captured in the opening of the tab.

The apparatus of the present invention comprises a plurality of thermal print heads, one for each character line, to allow for coding at production speeds. The print heads are spring biased against the article to be coded during the coding operation and retracted by solenoid means when the article moves stepwise through the thermal line printer between coding steps so as to avoid damage to the print heads by the moving article.

BRIEF DESCRIPTION OF THE DRAWINGS

The present invention will be more readily understood from a consideration of the following illustrative drawings in which:

FIG. 2 is a partial sectional plan view of the thermal line printer of the present invention.

FIG. 3 is an end view of the thermal line printer of the present invention.

FIG. 4 is a top view of the thermal line printer of the present invention taken along line 4—4 of FIG. 3.

DETAILED DESCRIPTION

The method and apparatus of the present invention is particularly adaptable in any number of environments where it is necessary to code or mark particular goods or containers containing the goods. Thus, the present invention may be employed in coding beverage containers, price labels, labels for clothing, bakery goods or any other type of goods where coding is required in high speed production operations. One particularly preferred environment for employing the method and apparatus of the present invention is in the coding and packaging of baked goods and, therefore, for purposes of illustration, the method and apparatus of the present invention will be described in such a combination.

Figure 1:
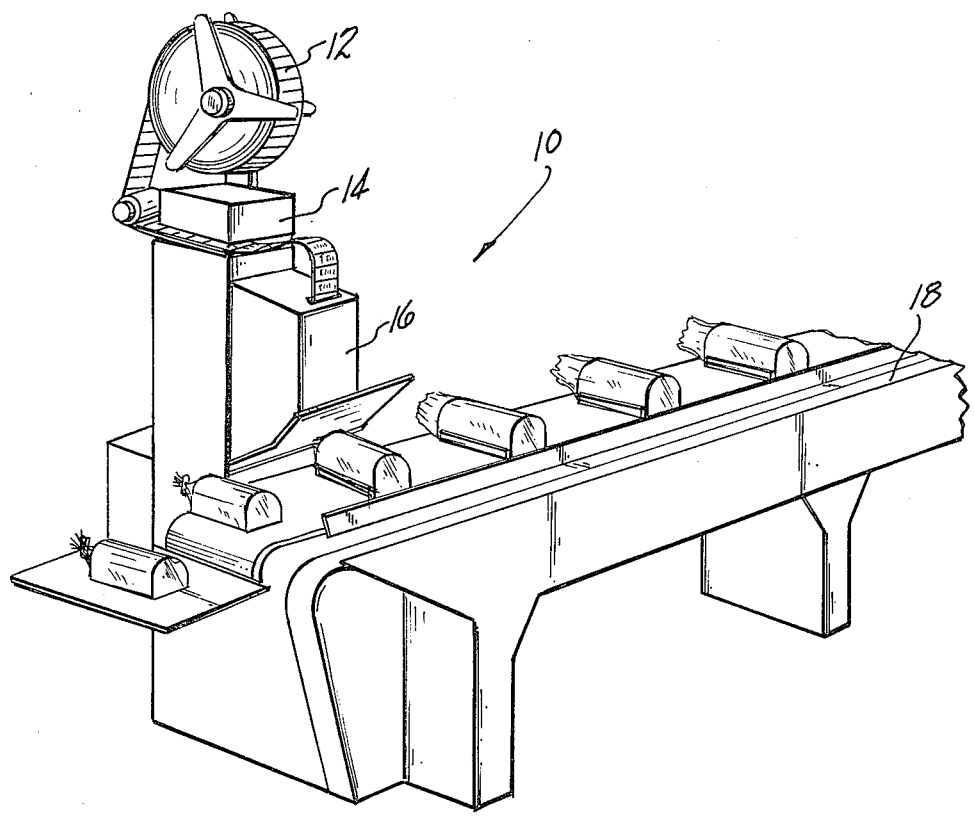
FIG. 1 is a schematic illustration of a preferred embodiment of the present invention in a coding and packaging process.

Referring now to FIG. 1 a coding and packaging apparatus 10 is illustrated comprising a roll of closure members 12, a thermal line printer 14, a bag closing machine 16 and a conveyor 18 for transporting the goods to be packaged and closed. In accordance with the present invention, the thermal line printer 14 codes the closure members 12 at production speeds while the closure members are fed to the bag closing machine 16. The bag closing machine may be of the type disclosed in U.S. Pat. No. 3,163,970 or any other similar commercially available machine. The bag closure members 12 are provided with a thermal sensitive coating thereon so as to enable the thermal line printer 14 to code the closure members. The thermal sensitive coating, which is preferably in the form of a thermal sensitive paper, may be applied to the closure members 12 by means of pressure sensitive adhesives, thermal sensitive adhesives, mechanical bonding or the like as disclosed in copending application SN assigned to the assignee of the instant invention, said copending application being incorporated herein by reference. While it is possible to apply the thermal sensitive paper to the closure members inline and upstream of the thermal line printer 14 it is preferred that the closure members 12 be laminated during the manufacture thereof. Thus, for example, in the case of plastic tabs used as bag closures, the thermal sensitive paper is applied to a plastic substrate strip which is then formed by stamping or the like into the appropriate shape and thereafter rolled and shipped to the packaging facility where they will be coded by the thermal line printer 14.

The thermal line printer of the present invention is illustrated in FIGS. 2—4 and comprises a housing 102 which houses a plurality of thermal print heads 104. Each of the thermal print heads 104 contain a series of in-line dot elements which are printed in proper sequence on a thermal sensitive surface to form a matrix representing the desired character. For purposes of the present invention, any of a number of known thermal print heads are usable in the thermal line printer of the present invention, for example Texas Instruments Model EPN 3114 that utilizes beam-lead silicon integrated circuits to provide a 7-row-by-5 column character matrix. In the case of an electrostatic printing system, print heads such as those employed in Sharps Model EL 1163 electro sensitive printer may be used. In accordance with the present invention, the number of print heads employed correspond to the number of character lines to be printed. For purposes of illustration five print heads are shown, each print head simultaneously printing one character line sequentially on the article to be coded as the article moves stepwise through the thermal line printer. Thus, the first print head prints character line 1, the second character line 2, the third character line 3, etc. Therefore, when the article to be coded reaches the fifth print head, four character lines have already been printed on the article and the fifth print head will print the fifth and last character line thereon. The provision of multiple print heads allows for the printing of multiple character line messages in high speed production operations. For example, in the coding and packaging apparatus illustrated in FIG. 1, the production rate requires that messages be printed in the range of 100 messages/minute. In accordance with the present invention, it is possible to increase operating speeds seven fold by providing one thermal print head for each dot line within a character line. Likewise, it should be appreciated that operating speeds can be reduced without limit by changing the program drive of the thermal line printer.

Referring now to FIGS. 2-4, the thermal print heads 104 are mounted on carrier blocks 106 which in turn are pivotably mounted on pins 108. A pair of posts 112 project out of the backside 110 of the carrier blocks 106 opposite the thermal print heads 104 and receive a ferromagnetic plate 114 which is secured to said posts by any suitable means such as nuts and lock washers or the like (not shown). Threadably received in the bottom wall 116 of housing 102 is a pair of spring adjustment members 118 for each thermal print head 104 comprising a threaded stem 120 and stop member 122. A spring member 124 is positioned around the posts 112 and threaded stems 120 between the ferromagnetic plates 114 and the stop members 122 for biasing thermal print head 104. The provision of an adjustment member 118 for controlling the biasing force of the thermal print heads 104 against the thermal sensitive article to be coded is critical to the present invention. The quality of the dot produced by the thermal print heads and correspondingly the resultant character is directly related to the force of the thermal print head against the thermal sensitive article to be coded. For example, when employing the Texas Instruments Model EPN 3114 thermal print head a force of 80 to 100 grams must be maintained. It is a principal feature of the present invention that each of the thermal print heads 104 have a solenoid 126 associated therewith for retracting the print heads 104 against the bias of the spring members 124 upon actuation of the solenoid 126 by the printer logic which will be described in detail hereinbelow. By retracting the thermal print heads 104 by the solenoids 126 the print heads will not be damaged by the thermal sensitive article to be coded as the article moves stepwise through the thermal line printer and is slewed by the stepping motor 128.

Figure 5:
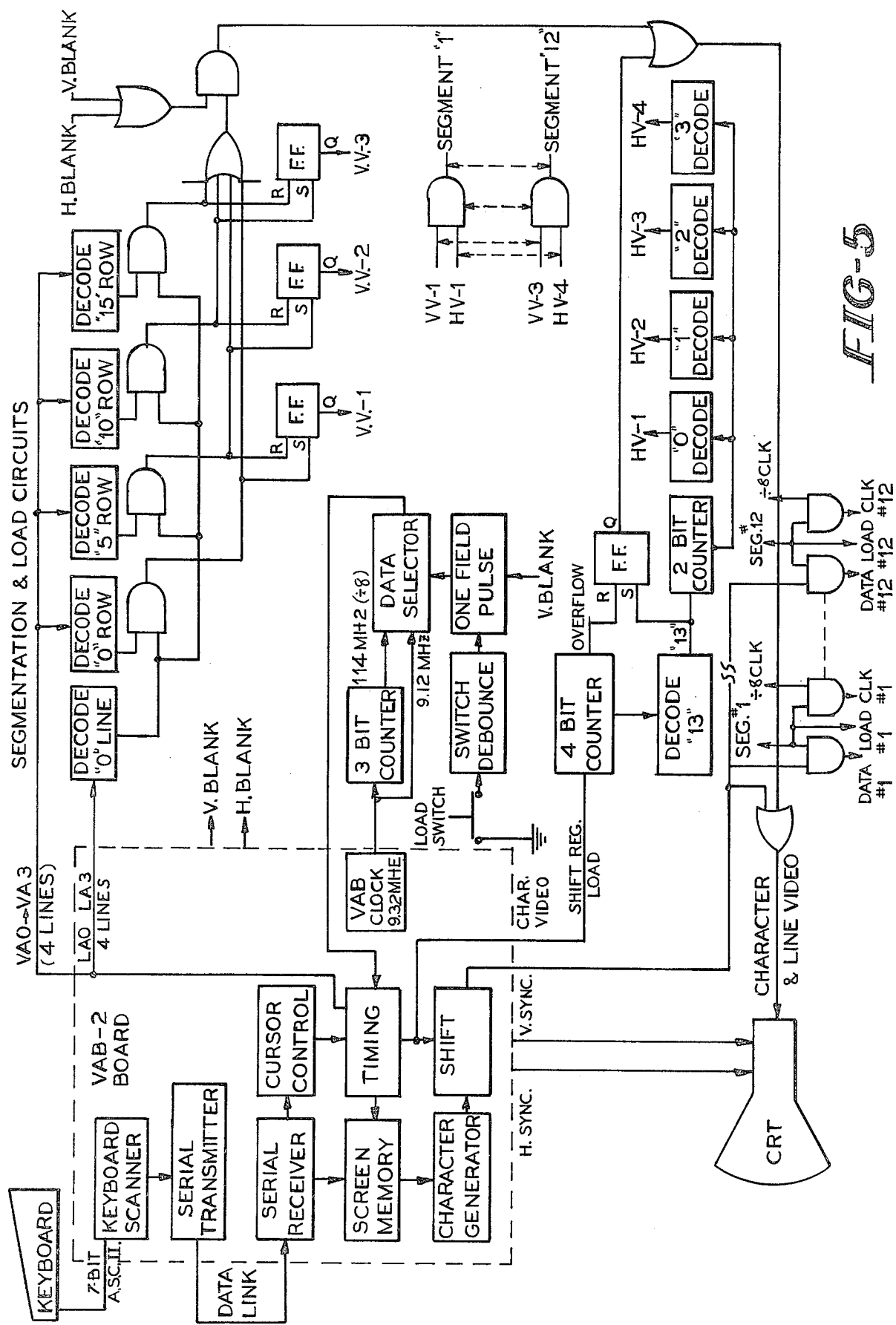
FIGS. 5 and 6 are simplified block diagrams illustrating the microprocessor memory employed in the present invention.

Again referring to FIGS. 2-4, a stepping motor 128 which operates in response to the printer logic, blocked diagramed in FIG. 5, drives a pair of pinch rollers 130 which feed, stepwise, the thermal sensitive closure members 132 through the thermal line printer. Upstream of each thermal print head 104 is a guide roll 134 which guides the closure members 132 so that the closure members 132 do not contact the lead edge of the thermal print heads 104 as the closure members 132 are fed stepwise by stepping motor 128 through the thermal line printer. A rubberized idler roller 136 is precisely positioned opposite each thermal print head 104 so as to provide the necessary printing back up pressure. The idler roller 136 should be positioned so that the character matrix on the thermal print head 104 is opposite that point on the idle roller 136 contacted by a tangent drawn parallel to the surface of the thermal sensitive closure members 132.

A photo sensor 138 is provided for sensing the position of the closure members for controlling the feeding of the thermal sensitive closure members 132 through the thermal line printer. The operation of the photo sensor 138 will be discussed in detail hereinbelow with regard to the printer logic diagrammed in FIGS. 5 and 6.

Figure 6:
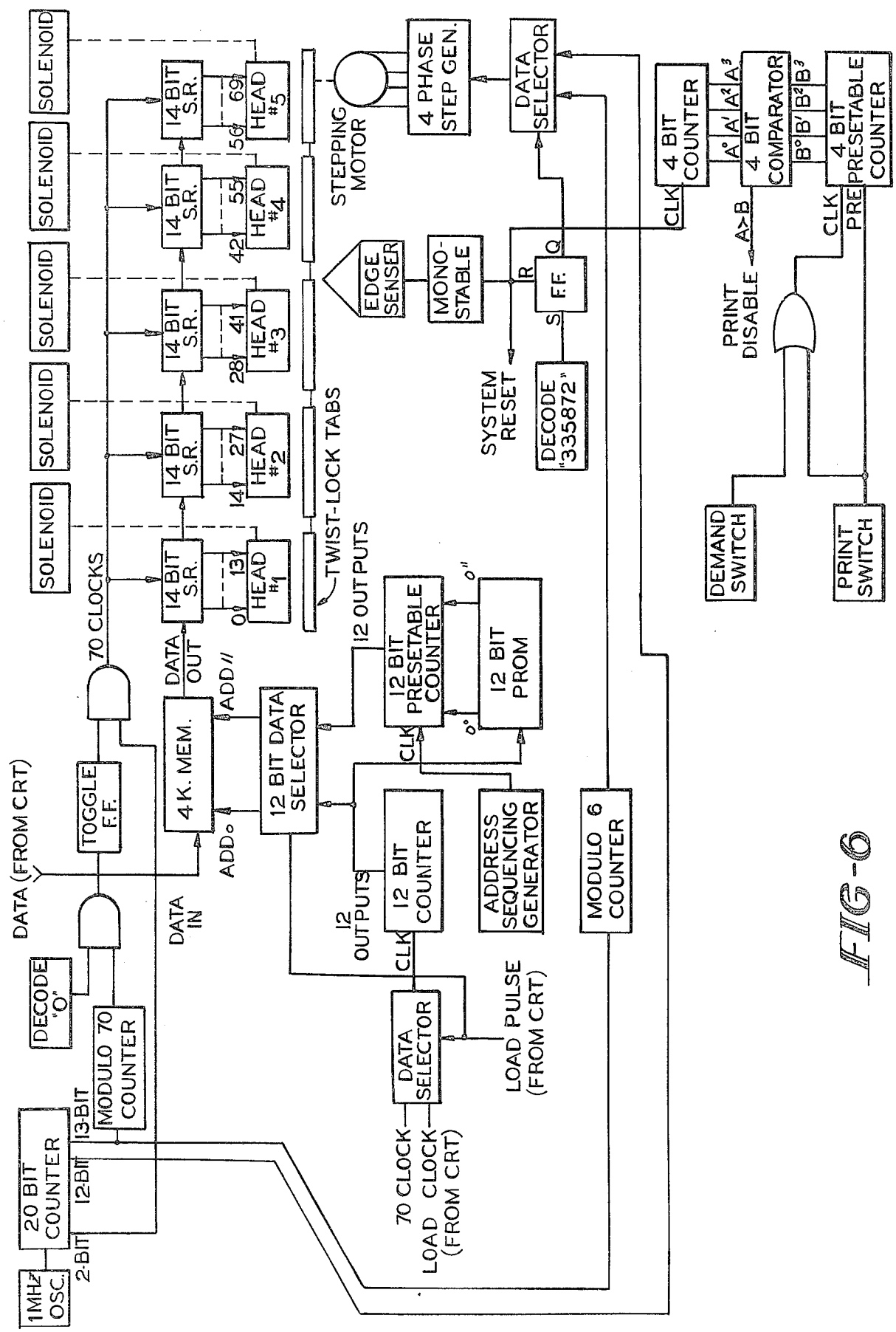

The microprocessor memory or printer logic employed with the thermal line printer in the process of the present invention is illustrated in a simplified block diagram in FIGS. 5 and 6. Referring to FIGS. 5 and 6, the message to be coded is punched in on the Keyboard. The Keyboard Scanner scans the output of the Keyboard to detect a strobe pulse and the A.S.C.I.I. code (7 bit code) that represents the letter or number of the key that was depressed. Keyboard parallel data is serialized and transmitted via the Data Link (opto-coupler) to the Serial Receiver and stored in the Screen Memory (C.R.T.). The position that data is stored in the Screen Memory is determined by the cursor position on the C.R.T. screen. The cursor is moved one character position for every depression of a key. Data is read out of the Screen Memory by being addressed by the master timing. The A.S.C.I.I. code that was stored in memory is converted to screen character dots by the Character Generator (PROM). The parallel data (from Character Generator) is serialized by the Shift Register in a Video Format.

The VAB board provides timing signals for the Video Segmentation Circuit. Line Address (LA-0, LA-1, LA-2, and LA-3) from the VAB board are used to identify the video lines on the 16 rows of characters. The Row addresses (VA-0, VA-1, VA-2, and VA-3) from the VAB board are used to identify the 16 rows of characters.

The VAB board supplies Vertical and Horizontal sync signals for the Video Monitor (C.R.T. display). The VAB supplies Vertical and Horizontal blanking signals for the line video signals.

The Video screen is divided into sections of 5 lines of 14 characters. This coincides with the amount of data that will be printed on the Twist-Lock Tabs. The Video screen is formatted in 16 lines of 64 characters. The Segmentation Circuit divides the screen into 4 groups of 14 characters horizontally and 3 groups of 5 lines vertically. This gives 12 distinct groups which can supply data for 12 different "Printer Assemblies". The boundaries of these groups are defined by white bars vertically and white lines horizontally.

The Character clock (one clock period per character position) is applied to a 4 bit counter. The output of the 4 bit counter is applied to a decode 13 circuit. The output of the 4 bit counter overflows at count 15. The 13 count and the 15 count pulses are applied to a "Flip Flop" to produce the two character wide vertical boundaries. The area where the characters are printed is 14 character wide (0 count to 13 count).

The 13 count pulse is applied to a 2 bit counter. Count 0, 1, 2, and 3 are decoded. The decoding identifies the four horizontal areas for data to be entered. They are called HV-1, HV-2, HV-3, and HV-4 (HV-1=Horizontal Video-1 etc.).

Line addresses and character row addresses are used for decoding the vertical segments. Line 0 is decoded and is "ANDED" with the following row decodes: Row 0; Row 5; Row 10; Row 15. This produces the following signals: Line 0 Row 0; Line 0 Row 5; Line 0 Row 10; Line 0 Row 15. The Line 0 Row 0 signal sets a "Flip Flop" and Line 0 Row 4 resets the "Flip Flop". The output of this "Flip Flop" is called VV-1 (vertical video-1). The Line 0 Row 5 sets a "Flip Flop" and Line 0 Row 10 resets the "Flip Flop". The output of this "Flip Flop" is called VV-2. The Line 0 Row 10 sets a "Flip Flop" and the Line 0 Row 15 signal resets it. The output of this "Flip Flop" is called VV-3. The HV-1 through HV-4 signals and the VV-1 through VV-3 signals are "ANDED" together producing 12 different combinations (examples: HV-1 "ANDED" with VV-1; HV-1 "ANDED" with VV-2; HV-1 "ANDED" with VV-3; HV-2 "ANDED" with VV-1; etc.). These "ANDED" signals are the 12 segmented video signals.

The Line 0 Row 0, Line 0 Row 5, Line 0 Row 10, and Line 0 Row 15, signals are also used to produce the 4 horizontal (white video) lines to mark the boundaries of the vertical segments and the C.R.T.

To load the data from a segment of the C.R.T. screen to the Printer Assembly a front panel switch is depressed. When the switch is depressed it produces a signal that lasts for one video field. This front panel switch is called a Load Switch. The one field signal has two functions: (1). It enables a divided by 8 VAB clock, (2). Provides enabling for a load signal to the Printer Assembly.

The divide by 8 VAB clock comes from a 3 bit counter. This signal is necessary to slow down the data to a 1.14 MHZ clock rate (9.12 MHZ÷8=1.14 MHZ) from a 9.12 MHZ clock rate (VAB clock).

The one field load signal is applied to Printer Assembly to initiate a memory load sequence. The information in one of the segments is loaded into the Printer Memory sequentially. The segment signal allows only the divide by eight VAB clock to step the memory and only during the segment times.

The Printer Assembly functions in the following manner.

(A) Loads data from the Video screen in 4k Memory (in a sequential linear manner);

(B) Reads the Memory in proper non-sequential manner and applies it to the five 14 bit Shift Register that drives the five print heads;

(C) Provides the stepping motor with pulses to step and slew the stepping motor;

(D) Provides the control circuitry for print initiation, demand memory (16 units) and edge sensing; and (E) Provides the timing to enable dots 1–5 on the "Printheads" to coincide with Memory data.

Data, Load Clock, and Load Pulse from the C.R.T. Assembly are used to load the 4k memory in the Printer Assembly. The Load Pulse has three functions, first it enables the loading of the 4k memory, second it gates Load Clock (through Data Selector) to 12 bit counter, and finally it enables 12 bit counter (through 12 bit Data Selector) to sequentially address 4k memory.

The 4k memory is loaded one time from the C.R.T. assembly. The data is retained until a new load sequence is initiated from the C.R.T. assembly. The data is loaded in a linear sequential manner in the same format that is presented on the Video screen (C.R.T.). The only difference is the data is condensed. The non-character video lines, the non-pertinent segments, and the video blanking times are not loaded into memory.

The loaded data in the 4k memory must be read out in a special manner to reformat it. The reformatting is necessary to properly drive the "Thermal Printheads". The "Thermal Printheads" consist of 14 characters groupings with 5 thermal dots per character grouping. Only one of the 5 thermal dots can be addressed at any one time. This is necessary to reduce the number of leads from the "Printhead" from 70 (5 dots×14 characters) to 19 (14 dots+5 dot enables). The "Thermal Printhead" must be used in the following manner.

(A) Enable dot number one;

(B) Apply data to 14 character dots that only represent the first dot of each character of a single line (video line) of a single row (character row) on the Video screen;

(C) Enable dot number two;

(D) Apply data to 14 character dots that only represents the second dot of each character of a single line (video line) of a single row (character row) on the Video screen; and (E) The above process is repeated until all five dots are enabled and printed in the 14 character positions of one video line.

The Twist-Lock Tabs are moved the appropriate amount by the stepping motor to print the second video line of information. Steps A–E above are repeated and the stepping motor is again incremented. This process continues until 7 video lines (one character row) of information are printed.

The Printer Assembly contains 5 "Thermal Printheads" to increase system throughput. "Printhead" #1 prints character Row 1 of a segment on the Video screen. "Printheads" 2 through 5 print their respective character rows of a segment on the Video screen.

The 12 bit (data output) P.R.O.M. configurations (Programmable Read Only Memory) output is used to load a 12 bit presettable counter. The output of the 12 bit presettable counter addresses the 4k memory. The PROM provides the addressing for the first dot of each character row. The addressing for dots 2 through 5 is accomplished by Address Sequencing Generator provides one extra clock pulse for the second dot; two extra clock pulses for the third dot; three extra clock pulses for the fourth dot and four extra clock pulses for the fifth dot. The PROM is sequenced 70 bits at a time. The 70 bits represent 14 dots for the 5 "Printheads". Temporary storage of the 70 bits of data is accomplished by five 14 bit Shift Registers.

The main timing for the printing sequence uses a 20 bit counter. The oscillator for the 20 bit counter is a 1 MHZ crystal. The 13 bit of the 20 bit counter is the clock for a Modulo 70 counter. The Modulo 70 counter output is "ANDED" with a decode "0". The "ANDED" signal is applied to the clock input of a toggle "Flip Flop". The output of the "Flip Flop" produces a pulse that is 70 clock periods wide (as a 500 KHZ rate). This pulse is "ANDED" with the first bit of the 20 bit counter to provide 70 clocks for the 12 bit counter (for PROM addressing) and 70 clocks for the five 14 bit Shift Registers.

The stepping motor has 2 modes of operation. First it indexes the Twist-Lock Tabs two steps after each video line is printed and second to slew the Tabs when all seven video lines are printed. The slew signal is decoded from the 20 bit counter. The slewing is stopped and all logic is reset if the edge of the Twist-Lock Tab is sensed. The slew signal also drives solenoids for the 5 heads to withdraw heads from the Tabs while slewing to prevent damaging the heads.

The print switch loads a count of 16 into a 4 bit counter. The output of this counter is applied to a 4 bit Comparator. This counter is clocked up by a Demand Switch from the assembly line when another printed Twist-Lock Tab is required. Another 4 bit counter is clocked up 1 count for every edge that sensed. The output of the second 4 bit counter is applied to the other part of the 4 bit Comparator. If the first counter output is greater than the second counters output the printing process continues, if the second counters output is greater than the first the printing process is suspended until either the Print Switch or the Demand Switch is activated.

The particular microprocessor memory is described above as controlling a single printer assembly. It should be appreciated that the microprocessor may operate multiple printer assemblies at the same time.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for coding and packaging merchandise in a bag comprising the steps of:
   (a) providing a plurality of closure tabs having a sensitive surface selected from the group consisting essentially of thermal sensitive and electro sensitive means, each of said closure tabs being divided into N adjacent areas corresponding to the number of character lines being printed;
   (b) providing a plurality of bags containing merchandise;
   (c) providing a printer having N print heads selected from the group consisting essentially of thermal print heads and electrostatic print heads arranged in series wherein N corresponds to the number of character lines to be printed;
   (d) providing logic circuit means for feeding a plurality of closure tabs to said thermal printer such that the $N_1$ area on $N_1$ closure tab is associated with $N_1$ print head, $N_2$ area on $N_2$ closure tab is associated with $N_2$ print head, etc.;
   (e) providing logic circuit means for sensing when said $N_1$ area on said $N_1$ closure tab is associated with said $N_1$ print head, said $N_2$ area on said $N_2$ closure tab is associated with said $N_2$ print head, etc. and simultaneously bringing said print heads associated with said area on said closure tabs in contact with said areas for printing a character line on each of said closure tabs;
   (f) providing logic circuit means for simultaneously retracting said print heads and advancing said closure tabs such that $N_3$ area on said $N_2$ closure tab is associated with $N_3$ print head, $N_2$ area on $N_1$ closure tab is associated with $N_2$ print head, $N_1$ area on $N_0$ closure tab is associated with said $N_1$ print head, etc.;
   (g) providing logic circuit means for sensing when said $N_3$ area on said $N_2$ closure tab is associated with said $N_3$ print head, said $N_2$ area on said $N_1$ closure tab is associated with said $N_2$ print head, said $N_1$ area on said $N_0$ closure tab is associated with said $N_1$ print head, etc. and simultaneously bringing said print head associated with said areas on said closure tabs in contact with said areas for printing a character line on each of said closure tabs;
   (h) repeating said feeding and printing until all of said plurality of closure tabs are coded with N character lines;
   (i) feeding said coded closure tabs to a bag closing apparatus; and
   (j) applying said tabs to said bags containing said merchandise using said bag closing apparatus thereby closing same.

2. A process according to claim 1 further including providing logic circuit means for readily varying the coded message to at least one of said N print heads.

3. A process according to claim 2 further including printing said message on said closure tabs at a rate of about 100 messages per minute.

4. A process according to claim 1 further including the steps of:
   providing a rigid substrate;
   coating said substrate with said sensitive medium; and
   forming said rigid substrate into said closure tabs.

* * * * *